Jan. 13, 1931.  R. E. SAGLE  1,789,195
OILING SYSTEM
Filed Feb. 24, 1925    2 Sheets-Sheet 1
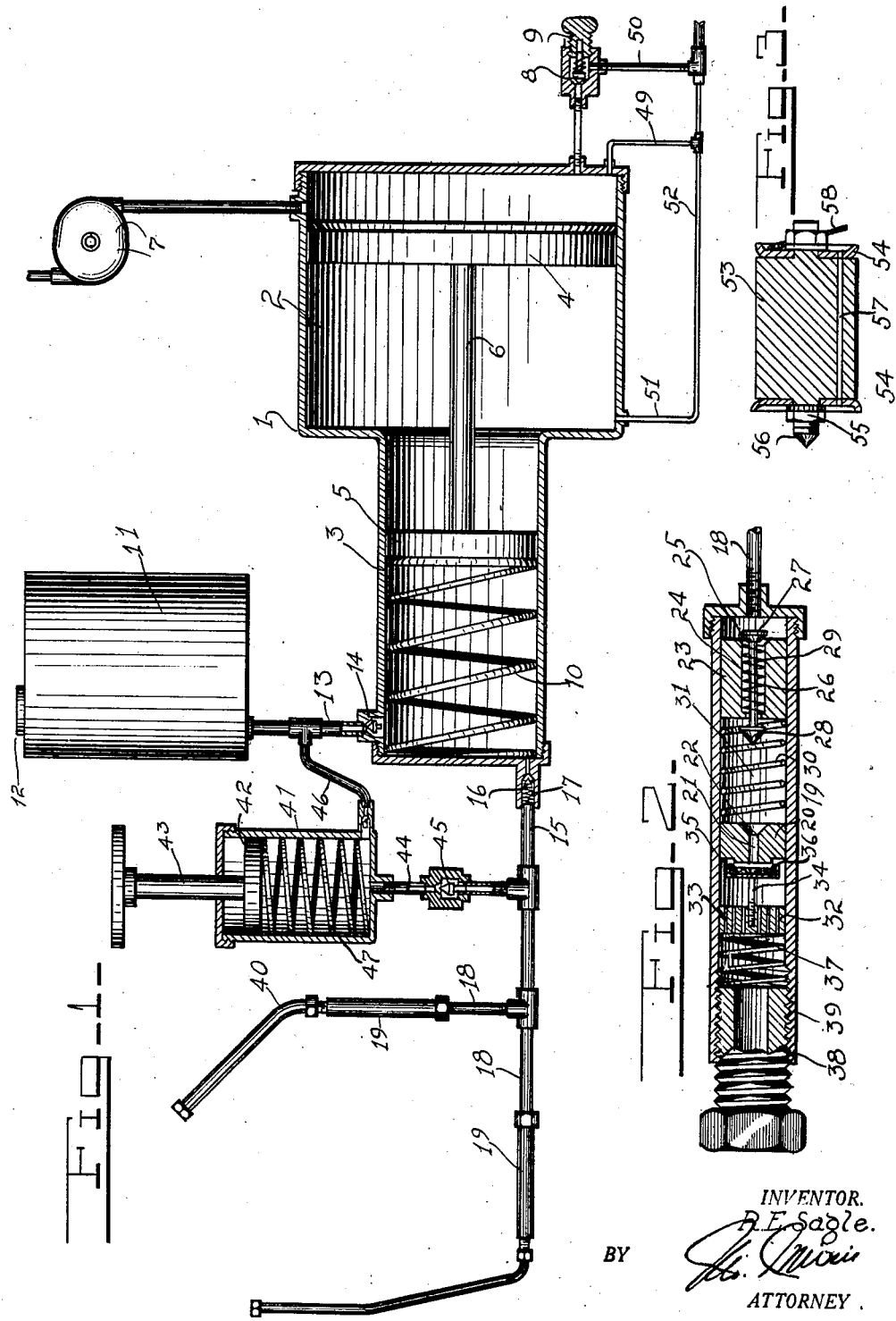
INVENTOR.
R. E. Sagle.
BY
ATTORNEY.

Jan. 13, 1931.   R. E. SAGLE   1,789,195
OILING SYSTEM
Filed Feb. 24, 1925   2 Sheets-Sheet 2
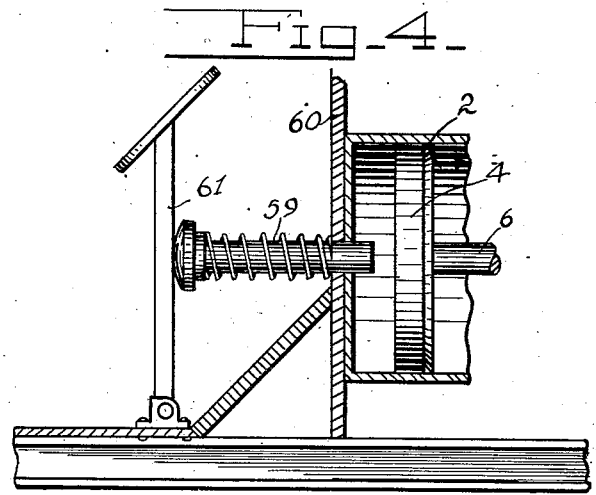
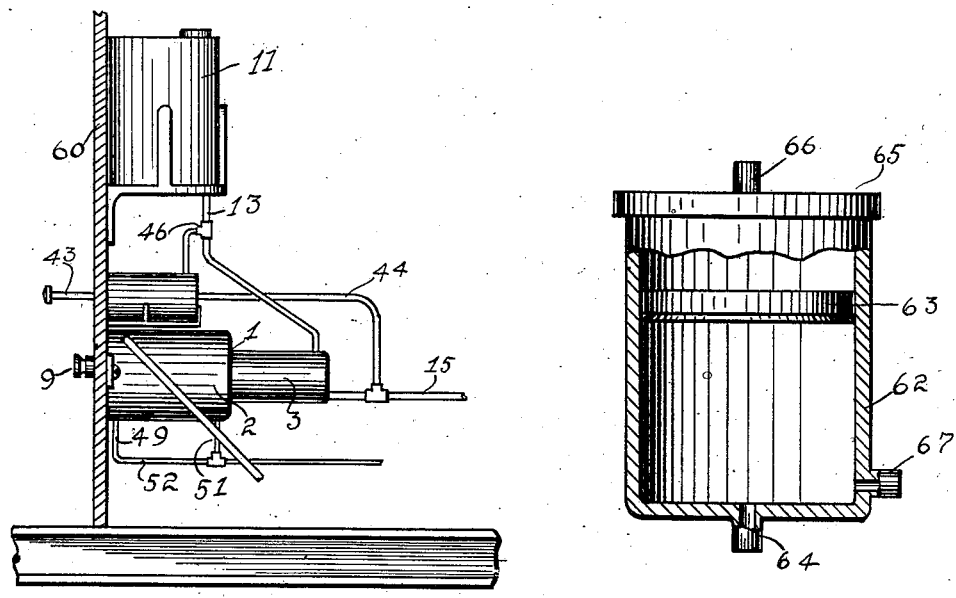
INVENTOR.
R.E. Sagle.
BY
ATTORNEY.

Patented Jan. 13, 1931

1,789,195

UNITED STATES PATENT OFFICE

ROY E. SAGLE, OF ROSEVILLE, OHIO

OILING SYSTEM

Application filed February 24, 1925. Serial No. 11,278.

This invention relates to an oiling system for use in connection with motor vehicles, wherein provision is made for maintaining a renewable supply of lubricant under a constant unvarying though regulatable pressure, with the delivery at the particular point or points to be lubricated capable of such regulation as to deliver to that point that unvarying constant supply deemed necessary for a proper lubrication thereof.

The improved lubricating system is to be pressure operated, with the pressure generated through some appropriate part of the motor unit as now constructed, for example, the usual oil pump, with the varying pressure developed by this pump so controlled as to maintain the oiling system under a constant unvarying pressure as the initial motive power for the oil feed, with the mechanical arrangement such as to augment this initial power for direct effect upon an independent automatically renewable source of oil or lubricant for direction through various pipes to the respective points of use.

Each particular point to be lubricated is provided with a separate delivery pipe for directing the lubricant thereto, and there is arranged in each delivery pipe, preferably as a separate and renewable element, a feed control device through which, under the predetermined constant pressure, the oil or other lubricant is delivered in that exact measured quantity required for the particular bearing point, it being understood that each control device may be set to deliver any measured quantity within the limits of the pressure employed.

In connection with the automatic regulatable and constant lubricating system, there is combined an auxiliary lubricant feeding system, in the use of which a relatively increased quantity of oil or other lubricant may be delivered at will through the various feed control devices, to thereby provide the bearing points with an excess quantity of lubricant at the option of the driver. This is highly desirable where the vehicle has been standing for several days and an initial and excess supply of lubricant is desired to protect the bearing points until the automatic system, which of course is responsive only to the travel of the vehicle, has had an opportunity to start operation.

The invention also contemplates the utilization of the feeding pressure as a means for feeding semi-solid lubricant, as grease, to those points where this character of lubricant is to be desired.

The invention is illustrated in the accompanying drawings, in which:

Fig. 1 is a view in elevation, partly in section, illustrating the improved system, the preferred form of manual feeding means being shown.

Fig. 2 is a longitudinal sectional view of the feed control device.

Fig. 3 is a modified form of the plunger of the feed control device.

Fig. 4 is a sectional view showing a modified form of the manual feeding means.

Fig. 5 is a view in elevation, partly in section, showing a form of arrangement of the various parts on the dash of the vehicle.

Fig. 6 is a broken sectional view of a grease cup for feeding semi-solid lubricant through the pressure system of this application.

The improved system comprises a plurality of instrumentalities designed preferably to be attached to the engine side of the dash of the vehicle, with feed pipes leading therefrom to the various points to be lubricated. It is to be understood that the present system is designed to reach substantially all those points on the vehicle which now require independent lubrication, usually through grease cups or the like, so that as the vehicle is traveling, a constant uniform and regulatable quantity of lubricant will be automatically delivered to the particular point, with the quantity delivered during a particular period varying for each point of lubrication, as may be required for the proper lubrication thereof.

In the preferred embodiment of details illustrated, the invention comprises a cylinder 1, adapted to be removably secured to the dash, and including a pressure chamber 2 and a coaxial diametrically reduced feeding chamber 3. A piston 4 is arranged in the pressure chamber for substantially nonleaking fit therein, a similar piston 5 being arranged in the feeding chamber, with the two pistons connected by a rod 6. Pressure is admitted behind the piston 4 from a pressure producing element of the motor unit, as for example, the usual oil pump 7. As the pressure of this oil pump varies with the speed of the vehicle, and as it is of importance that the pressure in the pressure chamber 2 be maintained constant, the pressure side of the piston 4 is provided with an automatic relief valve 8, regulatable through a manually controlled member 9, whereby the pressure in the pressure chamber may be maintained constant, notwithstanding the variable pressure of the element 7, with the degree of such pressure regulatable at will.

A spring 10 is arranged in the feeding chamber, working in opposition to the pressure, so that on the cessation of such pressure, the pistons 4 and 5 will be moved to their inward limit of movement, presenting the maximum length of the feeding chamber in advance of the piston 5. A reservoir 11 having a filling opening 12 is in communication with the feeding chamber 3 through a pipe 13, having a valve 14 closing against communication between the reservoir and feeding chamber under pressure in the feeding chamber. The reservoir is intended as an automatic re-charging supply for the feeding chamber, such reservoir being charged from time to time as required by the user, and obviously operating on the cessation of pressure and the movement of the pistons 4 and 5 under the action of the spring 10 to refill the feeding chamber.

A main feed pipe 15 leads from and communicates with the feeding chamber, a valve 16 opening under pressure from the feeding chamber and closing through the medium of a spring 17 in the absence of such pressure, being arranged in this pipe. A series of branch feeding pipes 18 lead from the main feeding pipe to the various points to be lubricated, it being understood that the invention is in no wise concerned with the character, disposition, or size, of such feeding pipe, as they may be appropriately varied for each vehicle with which the system is to be used.

It will of course be understood that the system is designed to lubricate a number of different points on the vehicle structure, and that ordinarily the lubrication required in a given time by one of such points will vary in quantity from the lubrication required in the same time by another of such points. Provision is made in the present system to permit delivery to a particular point within a given period only that quantity of lubricant required for this particular point, and this without regard to the quantity required in the given time for any other particular point. The feed control devices, through which this result is obtained, must thus be capable of adjustment to permit varying quantities of lubricant to flow therethrough in a given time, and this detail forms an important part of the present invention.

As illustrated particularly in Fig. 2, the feed control device comprises an elongated tubular casing 19, formed at one, the entrant end, for the connection of the auxiliary feed pipe 18 thereto. At a point intermediate the ends of the casing 19, there is provided a division block 20, fixed with relation to the casing and formed with a central channel 21, having a valve seat 22 toward the entrant end of the casing. Slidably mounted in the casing beyond the block 20 toward the entrant end of the casing, is a plunger 23 having in the preferred form illustrated in Fig. 2, a central longitudinally ranging opening 24, formed at the entrant end with a valve seat 25. A spring pressed valve stem 26 of materially less diameter than that of the opening 24, is slidably arranged in the latter, and provided at one end with a valve 27 to cooperate with the seat 25, and at the opposite end with a valve 28 adapted to cooperate with the valve seat 22 in the block 20. A spring 29 normally holds the valve stem 26 in position to maintain the valve 27 spaced from its seat 25, notwithstanding the pressure in the pressure cylinder 2, so that in the automatic operation of the system, the opening 24 in the plunger is normally free of obstruction. A spring 30 is arranged in the casing 19 bearing between the block 20 and the plunger 23, this spring also being non-yielding under the normal pressure of the automatic system, and thus maintaining the plunger 23 as a substantially fixed element during the operation of the automatic system, with a substantial chamber 31 in the casing 19 between the plunger and block.

Slidably mounted in the casing beyond the block 20 toward the delivery end of the casing, is a disc 32 formed with a series of longitudinally extending openings 33, so that the disc affords but little obstruction to the passage of the lubricant. A rod 34 projects from the disc 32 and is terminally provided with a skeleton frame 35, in which is secured a permeable restraining disc 36. The disc 36 is thus disposed in line with the channel 21 of the block 20, but is of materially less diameter than the diameter of the interior of the casing 19. The restraining disc is made of material which will permit the passage therethrough of lubricant, with such passage capable of being restricted or restrained under varying pressure on the disc. A spring 37 is arranged beyond the disc 32, the opposite end of the spring bearing against a nipple 38, having threaded cooperation at 39 with the outlet end of the casing 19. The nipple 38 is formed for the connection of a pipe extension as 40 thereto, which pipe extension may lead to and be directly connected to the part into which the lubricant is to be introduced.

Obviously the pressure of the spring 37 and thereby the pressure of the restraining disc 36 across the outlet end of the opening 21, may be regulated as desired by the adjustment of the nipple 38, and if this disc 36 is constructed to vary the permissible passage of lubricant by the pressure on the disc, it is apparent that the parts may be adjusted to permit only the desired quantity of lubricant to pass through the casing 19 in a given time. Obviously, the quantity of lubricant permitted to pass the feed control device in an auxiliary feed pipe 18 leading to a particular point, may thus be made to vary from the quantity of lubricant permitted to pass a feed control device in another auxiliary feed pipe. Thus each auxiliary feed pipe may be caused to deliver to the particular point it is designed to lubricate just that quantity deemed necessary for the proper lubrication of that point, and in this particular, the present system will properly take care of all points to be lubricated notwithstanding the fact that each may require a different quantity of lubricant in the same period.

In the operation of the automatic system, it is understood that pressure, here in the form of oil under pressure of the pump 7, is delivered behind the piston 4 and the latter moved forward, causing similar action of the piston 5. Owing to the difference in areas between the pistons 4 and 5, the operating pressure behind piston 4 is greatly increased, and thus a desired feeding pressure is obtained notwithstanding a comparatively low motive pressure. The oil from the feeding chamber 3 is fed to the respective feed control devices, passing through the opening 24 in plunger 23, through the chamber 31, through the channel 21, through the restraining disc 36, in the quantity permitted by the pressure on that disc, due to the adjustment of the nipple 38, and so to the point to be lubricated. Thus as long as the motor element 7 is operating, the feeding piston 5 is being continually advanced, and oil is being delivered to the points to be lubricated. Upon the stopping of the motor element 7, as for example, when the engine stops, the pressure behind piston 4 is gradually relieved and the spring 10 moves the feeding piston 5 rearwardly. The oil in the feeding chamber 3 is then automatically replenished from the reservoir 11.

It is desired that the feeding chamber 3 will be of sufficient size to take care of a quantity of lubricant sufficient to satisfy lubricating demand for say a twenty-four hour period, though the average car is not driven constantly for this length of time. Upon any stopping of the motor, the lubricant in the feeding chamber 3 is automatically replenished from the reservoir 11, so that if the latter is filled from time to time, the system, so far as its automatic operation is concerned, is self-filling.

It frequently happens that the automobile is not used for a day or so, during which time the lubricant at the particular points may have dried. Under these circumstances, it is desirable to supply the points to be lubricated with an excess quantity of oil to maintain proper lubrication in the initial movements of the parts and until the automatic system is in proper operation. For this purpose, the system includes what may be termed a manual feeding of the lubricant to the points desired, the construction for this purpose including a cylinder 41 having a piston 42 therein, operated by a rod 43 by hand or connected to a foot pedal or other manual operating means. This cylinder 41 is connected by a pipe 44 with the main feed pipe 15 beyond the valve 16. Pipe 44 contains a valve 45 opening under pressure from the cylinder 41, and said cylinder is in communication through a pipe 46 with the supply pipe 13 from the reservoir to the feeding chamber. Pipe 46 has a valve controlled inlet to the chamber 41, the valve closing against pressure from the cylinder 41. A spring 47 normally holds the piston 42 elevated. Obviously from the above, the cylinder 41 is normally filled with lubricant from the reservoir 11, and when it is desired to utilize a hand feeding system, the piston 42 is depressed by hand with the required pressure. The oil is thus forced through the main feed pipe 15 and feed control devices, the feed chamber 3 being of course closed against oil flow in this direction. As the pressure of the manual feeding device is greatly in excess of that of the automatic feeding device, this pressure of the manual feeding device will operate in the feed control devices to first force the valve 27 to its seat 25, closing the opening 24, so that the incoming oil under pressure moves the plunger 23 longitudinally of the casing 19. This forces the oil accumulated in the chamber 31 through the channel 21, displacing the restraining disc 36, as the manual pressure overcomes the spring 37, and thus directing the oil in considerable quantity to the point to be lubricated. It will be noted that the oil from the manual pressure device acts under a pressure in excess of that of the automatic feeding device, and therefore an additional effect of the hand pressure feeding means is to flush the system with the effect to move any possible obstructions in the flow of the oil under the automatic systems. Thus the hand flushing system may be advantageously used at any period when it is thought the automatic system is failing to deliver oil at any particular point, as such hand system will thus not only flush the path of the oil to remove obstruction but will supply the particular point with a temporary excess of oil to insure against lack of lubrication.

In the provision of the automatic pressure means through the use of the oil pump for example, the oil therefrom will be delivered to the pressure chamber in rear of the piston 4, and in order to insure that this oil will find its way back to the usual motor oiling system, small pipes 49, 50, and 51, lead to a return pipe 52 directed to the crank case or other reservoir, so that the oil utilized for pressure, and any leakage around the piston, may be directed back into the system and thus utilized for its usual purposes.

In Fig. 3, I have shown a modified form of plunger for use in connection with the feed control device, wherein 53 indicates the plunger proper adapted for movement in the casing 19 and provided at each end with a cup washer 54 to insure pressure fit with the casing. This plunger has an integral projection 55, provided with a valve terminal 56 to cooperate with the valve seat 22 of the block 20, the projection serving, if desired, to receive the nut to hold the cup washer in place. The block 53 is formed with a longitudinal channel 57 for the passage of the lubricant under the automatic feeding system, the entrant end of this channel being adapted to be closed by a spring pressed disc valve 58, of an inherent resiliency to remain in open position under the automatic feeding pressure, but to be closed under the pressure developed in the hand feeding operation.

It is of course understood that when the vehicle is still, the feed chamber 3 is filled with lubricating oil, and under these conditions it is possible to dispense with the hand pressure cylinder 41 and directly operate the feeding piston 5 when hand feeding or flushing is desired. For this purpose I have illustrated in Fig. 4, a slightly modified arrangement in which a pressure stem 59, spring pressed in the outward direction, extends through an otherwise sealed opening in the wall of the cylinder 2 in line with the piston 4. This stem may extend through the dash, indicated at 60, and be operated, when desired, through the medium of a pedal means 61, or other appropriate element. Thus for hand feeding or flushing, the pedal is operated and the pressure piston 5 caused to move lengthwise the feeding chamber 3 and expel the desired volume of oil therefrom for the hand feeding or flushing.

In Fig. 5, I have shown more or less diagrammatically the arrangements of the various parts in connection with the dash board 60 of the vehicle, it being understood that this figure merely illustrates an effective grouping of the operative parts in a position which will not interfere with any of the usual details, while all parts are conveniently accessible for operation or repair.

In Fig. 6, I have illustrated a means whereby the automatic system, as well as the hand pressure system, may be utilized for feeding semi-fluid lubricant, as cup grease. For this purpose, a grease cup 62 is provided with a plunger piston 63 to deliver grease through the usual outlet 64, with said outlet formed for connection with the parts to be lubricated. The cap 65 of the cup is arranged for sealed connection and has an inlet 66 to which one end of the feed pipe extension 40 is connected. Under the pressure of the lubricant, in either the automatic or the hand operating systems, the plunger piston 63 is depressed to force the grease to the point of use.

A filling opening 67, for the reception of a grease gun or other pressure filler, is provided at the lower end of the cup to remove grease when desired.

The improved system is directed generically to the utilization of a variable pressure means operated while the vehicle is in motion, and to converting this variable pressure into a constant and continuous pressure. This constant pressure is augmented and utilized to direct a body of oil through a series of pipes to the points of use, each of the independent delivery pipes having a feed control device which may be adjusted to permit only a predetermined quantity of oil to pass thereby in a given time. Thus, each particular point to be lubricated may be given the necessary quantity of oil for the proper lubrication continuously during the operation of the vehicle, the construction providing for the automatic replenishing of the system with lubricant when the vehicle stops. Furthermore, a hand pressure feeding system is coupled with the automatic system and the feed control devices constructed to permit the passage therethrough under the pressure of the hand feeding system, of an excess quantity of oil for initial lubrication or for flushing the system to clear obstruction.

It is of course to be understood that the invention, while shown and described primarily as for use in connection with motor vehicles, may be used in any situation where it is desirable to provide a unitary lubricating system for a plurality of different points. Under these circumstances, as well as in connection with use on vehicles, the normal operating pressure, which is described and shown as automatically generated, may be furnished from a pressure tank with the pressure therein provided by hand operated pump or in any other manner. Thus the pressure herein described as automatic pressure would become below normal pressure for operation, while the pressure herein before described as the high manually operated pressure would become merely a flushing pressure sufficiently higher than the normal pressure to secure the result desired.

What I claim is:

1. An automatic oil feeding system for motor vehicles, comprising a pressure chamber, a piston therein, means operated by the vehicle for creating a pressure on one side of said piston, a feeding chamber of less diameter than the pressure chamber, a feeding piston in said feeding chamber connected with the first mentioned piston, means in the feeding chamber to return the pistons to a normal position on cessation of said pressure, a manually operable pressure means and an oil reservoir in communication with the feeding chamber and with the manually operable pressure means.

2. An automatic oil feeding system for motor vehicles, comprising a pressure chamber, a piston therein, means operated by the vehicle for creating a pressure on one side of said piston, a feeding chamber of less diameter than the pressure chamber, a feeding piston in said feeding chamber connected with the first mentioned piston, means in the feeding chamber to return the pistons to a normal position on cessation of said pressure, an oil reservoir in communication with the feeding chamber, an oil distributing pipe in communication with the feeding chamber and a manually operable pressure means in communication with the oil reservoir and with the oil distributing pipe.

3. An oil feeding system for motor vehicles, including a series of oil feeding pipes leading to the points of lubrication, pressure automatically produced in the operation of the vehicle for feeding oil through said pipes, feed control means arranged in the pipes to govern the quantity of oil passing through such means in a given time under such pressure, and means for generating a feeding pressure in excess of the automatic pressure, said feed control means being responsive to such excess pressure to permit the passage therethrough of a quantity of oil in excess of that permitted under the automatic pressure.

4. An oil feeding system for motor vehicles, including a series of oil feeding pipes leading to the points of lubrication, pressure automatically produced in the operation of the vehicle for feeding oil through said pipes, feed control means arranged in the pipes to govern the quantity of oil passing through such means in a given time under such pressure, and manually operated means for generating an excess feeding pressure at will, said feed control means being responsive to such excess pressure to correspondingly permit a passage of excess oil.

5. An oil feeding system for motor vehicles, comprising an oil distributing pipe, means for automatically generating a feeding pressure therein during the operation of the vehicle, means for manually generating an excess pressure therein at will, and an oil feeding device in said pipe to limit the flow of oil therethrough under the automatic pressure while permitting an excess flow of oil therethrough under the manually generated pressure.

6. A feed control device for use in automatic lubricating systems for motor vehicles, including a casing having an oil passage therein, a permeable member for governing said passage to permit a flow of oil therethrough in accordance with the pressure on said member, a spring for controlling said pressure, and means carried by the casing for adjusting the spring.

7. A feed control device for use in lubricating systems for motor vehicles, the passage of the lubricating fluid through said device being controlled by pressure automatically produced during movement of the vehicle or by an excess hand generated pressure at will, a casing having a plunger mounted for sliding movement therein, a valved opening through said plunger, means for holding the valve of said opening in open position under the automatic pressure and permitting it to close under the manually generated excess pressure, whereby to cause said excess pressure to bodily move the plunger, an oil control member adjustably held in the casing to limit the flow of oil thereby under the automatic pressure, said member being displaceable by the excess pressure to permit the passage of an excess amount of oil thereby, and means to limit the quantity of oil delivered under such excess pressure.

8. A feed control device for use in lubricating systems for motor vehicles, the passage of the lubricating fluid through said device being controlled by pressure automatically produced during movement of the vehicle or by an excess hand generated pressure at will, a casing having a plunger mounted for sliding movement therein, a valved opening through said plunger, means for holding the valve of said opening in open position under the automatic pressure and permitting it to close under the manually generated excess pressure, whereby to cause said excess pressure to bodily move the plunger, an oil control member adjustably held in the casing to limit the flow of oil thereby under the automatic pressure, said member being displaceable by the excess pressure to permit the passage of an excess amount of oil thereby, said casing being formed with a passage to permit the flow of oil thereto in the longitudinal movement of the plunger, and means to close said passage against the flow of oil following a predetermined movement of the plunger.

9. In a lubricating system a lubricant feeding means responsive to a normal operating pressure and a pressure in excess of such normal pressure, said feeding means including a member permitting the passage of lubricant therethrough under normal operating pressure to limit the quantity of lubricant passing through the feeding means in a given time, and an element carried by the feeding means and responsive to excess pressure to force a quantity of lubricant through the feeding means in excess of the normal delivery, said element operating to bodily displace the member to avoid interruption to the feeding of such excess quantity of lubricant.

10. An oil pressure system having an oil supply, a power driven pressure means to exert pressure upon the oil from said supply, a feed control device to limit the flow of oil under said pressure to the point of use, and an independent manually operable pressure means to augment the first mentioned pressure at will for an increased flow of oil by the control device, said control device being adjustable to vary the flow at will under the first mentioned pressure without effecting the increased flow under the augmented pressure.

11. An automatic oil feeding system for motor vehicles comprising an oil supply means operated in the movement of the vehicle for providing a normal operating pressure on such supply, means operable at will for creating excess pressure on said supply, and feed control device open to the passage of oil under normal and excess pressures said control device including a permeable member serving to restrict and thereby define the quantity of oil passing through the feed control device under normal operating pressure, and a plunger in said feeding control device responsive to said excess pressure to force an excess quantity of oil through the feed control device, said plunger operating to displace the permeable member to avoid its restrictive influence on the passage of oil.

In testimony whereof I affix my signature.

ROY E. SAGLE. [L. S.]